United States Patent
Ouyang

(10) Patent No.: US 12,327,076 B2
(45) Date of Patent: Jun. 10, 2025

(54) METHOD AND SYSTEM FOR MONITORING CLOCK DUTY CYCLES

(71) Applicant: Black Sesame Technologies Co. Ltd., Hubei (CN)

(72) Inventor: Bangjian Ouyang, Shenzhen (CN)

(73) Assignee: Black Sesame Technologies Inc., San Jose, CA (US)

( * ) Notice: Subject to any disclaimer, the term of this patent is extended or adjusted under 35 U.S.C. 154(b) by 701 days.

(21) Appl. No.: 17/728,304

(22) Filed: Apr. 25, 2022

(65) Prior Publication Data

US 2022/0358272 A1    Nov. 10, 2022

(30) Foreign Application Priority Data

May 8, 2021    (CN) .......................... 202110501215.1

(51) Int. Cl.
G06F 30/39 (2020.01)
G06F 1/14 (2006.01)
G06F 119/12 (2020.01)

(52) U.S. Cl.
CPC ................ *G06F 30/39* (2020.01); *G06F 1/14* (2013.01); *G06F 2119/12* (2020.01)

(58) Field of Classification Search
USPC ....................................................... 716/113
See application file for complete search history.

(56) References Cited

U.S. PATENT DOCUMENTS

| 4,468,614 A | 8/1984 | Takahashi et al. |
| 8,144,825 B1 * | 3/2012 | Duong ................ G06F 30/3312 |
| | | 375/354 |
| 2008/0013668 A1 | 1/2008 | Willis |

(Continued)

FOREIGN PATENT DOCUMENTS

| CN | 104079265 A | 10/2014 |
| CN | 105245203 A | 1/2016 |
| CN | 112740552 A | 4/2021 |

OTHER PUBLICATIONS

Xu Qin-jian, Liang Yuan, and Zhang Chao-hui, Design of Data Acquisition Card for Random Pulses, Electronic Design Engineering, Jul. 2010, vol. 18, No. 7.

(Continued)

*Primary Examiner* — Mohammed Alam
(74) *Attorney, Agent, or Firm* — Timothy T. Wang; Ni, Wang & Massand, PLLC

(57) ABSTRACT

An improved system for monitoring clock duty cycles, comprising: a first monitoring circuit configured to record a first quantity of high levels of the monitored clock signal sampled by a first random clock signal; a second monitoring circuit configured to record a second quantity of high levels of the monitored clock signal sampled by a second random clock signal, wherein the phase of the second random clock is adjusted by a second adjustment degree based on a first clock; a third monitoring circuit configured to record a third quantity of high levels of the monitored clock signal sampled by a third random clock signal, wherein the phase of the third random clock is the reverse of that of the first random clock; and a calculation module configured to determine a duty cycle of the monitored clock based on the first quantity, the second quantity, and the third quantity.

12 Claims, 4 Drawing Sheets

(56) References Cited

U.S. PATENT DOCUMENTS

| | | | |
|---|---|---|---|
| 2009/0125857 A1* | 5/2009 | Boerstler | G06F 30/333 |
| | | | 716/113 |
| 2016/0041212 A1* | 2/2016 | Darbinyan | G01R 31/31708 |
| | | | 327/33 |
| 2016/0241249 A1 | 8/2016 | Balamurugan et al. | |
| 2017/0124237 A1* | 5/2017 | Darbari | G06F 30/3312 |
| 2022/0358272 A1* | 11/2022 | Ouyang | G06F 30/39 |

OTHER PUBLICATIONS

Janne J. Lehtomaki, Risto Vuohtoniemi, and Kenta Umebayashi, On the Measurement of Duty Cycle and Channel Occupancy Rate, IEEE Journal on Selected Areas in Communications,2013, vol. 31, No. 11.

Zhang Zhipeng, Fu Dongwei, and Ling Ming, Design of Ear Tags for Low Power Cow Motion Monitoring Based on Dynamic Duty Cycle Sampling, Chinese Journal of Electron Devices, Dec. 2022, vol. 45, No. 6.

* cited by examiner

METHOD AND SYSTEM FOR MONITORING CLOCK DUTY CYCLES

CROSS REFERENCE TO RELATED APPLICATION

This patent application claims the benefit and priority of Chinese Patent Application No. 202110501215.1 filed on May 8, 2021, the disclosure of which is incorporated by reference herein in its entirety as part of the present application.

TECHNICAL FIELD

The present application relates to the technical field of integrated digital circuit designs, and more specifically, particularly to the, to a monitoring of clock duty cycles.

BACKGROUND

In the design of a Very Large Scale Integration (VLSI) digital circuit, the clock signals may be distorted by a Phase Locking Loop (PLL) jitter, external environment interference, and the clock signals itself passing through the corresponding path (such as through buffers, multiplexers, etc.). In these cases, the degree of distortion may depend on factors such as the severity of jitter, the degree of environmental interference, and the length of the clock signals. Generally, the more serious the jitter is, the longer the clock signal length is, the worse the interference of external environment is, the more serious the distortion will be.

For digital synchronous design, when the clock duty cycle is distorted from 50% down to 30% or up to 70%, or even worse, the sensitive double edge sample synchronization logic will not receive the correct data, the stability of the circuit is affected, which further causes the system to be disordered, the chip to work incorrectly or not to work. Hence, it is necessary to monitor the clock duty cycles.

The common way to monitor the duty cycles of the clock in the industry is to sample the monitored clock through a random clock, and obtain the duty cycles of the monitored clock based on probability statistics. The experimental results show that when it is necessary to obtain the actual high precision duty cycles of the monitored clock, the sampling times must approach to an infinity by using the method based on probability statistics, which is contrary to the requirements of conventional engineering design. In addition, in case that the clock is random (frequency, phase) and the precision of the random clock is not fs, with the method base on probability statistics, it is possible that the monitoring is not accurate. For example, the duty cycle is actually 30%, while the monitoring statistics come out to be 39%.

SUMMARY

Provided is an improved system for monitoring clock duty cycles. The system comprises: a basic monitoring circuit configured to record, under a valid basic monitoring state and by a first counter of the basic monitoring circuit, a basic quantity of high levels of a monitored clock signal sampled by a basic random clock signal; and i additional monitoring circuits, wherein each of the additional monitoring circuits is configured to record, under a valid additional monitoring state and by a first counter in the additional monitoring circuit, the quantity of high levels of a monitored clock signal sampled by an additional random clock signal of the additional circuit, the phase of the random clock signal of the additional circuit being adjusted on the basis of the phase of a basic random clock signal, so as to distinguish same from the basic random clock signal; i is an integer greater than or equal to 1; the phases of additional random clock signals of respective additional monitoring circuits of the i additional monitoring circuits are configured to be different from one another. The system also includes a calculation module, configured to determine a duty cycle of the monitored clock signal on the basis of the basic quantity and the quantity of high levels determined for each of the i additional monitoring circuits.

A system for monitoring clock duty cycles according to an example of the present application, as an example, i is 2, and the additional monitoring circuit comprises a second monitoring circuit and a third monitoring circuit, wherein the second monitoring circuit is configured to record, under a valid second monitoring state and by a first counter in the second monitoring circuit, a second quantity of high levels of a monitored clock signal sampled by a second random clock signal, the phase of the second random clock signal is adjusted relative to the phase of a basic random clock signal by an adjustment angle of 0 degree to 180 degrees; the third monitoring circuit is configured to record, under a valid third monitoring state and a first counter of the third monitoring circuit, a third quantity of high levels of a monitored clock signal sampled by a third random clock signal, the phase of the third random clock signal being set to be opposite to the phase of the basic random clock signal; and the calculation module is configured to determine a duty cycle of the monitored clock signal on the basis of the basic quantity, the second quantity, and the third quantity.

A system for monitoring clock duty cycles according to an example of the present application, as an example, the phase of the third random clock signal is opposite to the phase of the first random clock signal.

A system for monitoring clock duty cycles according to an example of the present application, as an example, the basic monitoring circuit comprises: a first exclusive-OR operation unit, configured to perform exclusive-OR operation on the monitoring enable signal and a monitoring enable signal three-level synchronized with the basic random clock signal, so as to generate a first pulse signal; a second counter, configured to latch, under the control of the first pulse signal, the sampling times n configured to the second counter, wherein a monitoring valid enable signal outputted by the second counter is always valid when the count in the second counter is not 0 and the monitoring enable signal is valid; a first inverter, inverting the monitoring valid enable signal to generate a signal monitor_finish_0. The second monitoring circuit comprises: a second exclusive-OR operation unit, configured to perform an exclusive-OR operation on the monitoring enable signal and a monitoring enable signal being in triple synchronization with the second random clock signal, so as to generate a second pulse signal; a fourth counter, configured to latch, under the control of the second pulse signal, the sampling times n configured to the fourth counter, wherein the monitoring valid enable signal outputted by the fourth counter is always valid when the count in the fourth counter is not 0 and the monitoring enable signal is valid; a second inverter, inverting the monitoring valid enable signal to generate a signal monitor_finish_1. The third monitoring circuit comprises: a third exclusive-OR operation unit, configured to perform an exclusive-OR operation on the monitoring enable signal and a monitoring enable signal being in triple synchronization with the third random clock signal, so as to generate a third pulse signal;

a sixth counter, configured to latch, under the control of the third pulse signal, the sampling times n configured to the sixth counter, wherein the monitoring valid enable signal outputted by the sixth counter is always valid when the count in the sixth counter is not 0 and the monitoring enable signal is valid; a third inverter, inverting the monitoring valid enable signal to generate a signal monitor_finish_2. The system according to the example also includes an AND operator that performs an AND operation on the received monitor_finish_0, monitor_finish_1 and monitor_finish_2, so as to generate a system monitoring completion flag signal monitor_finish; the clock monitoring circuit is configured to continue the monitoring operation under a signal indicating that the system monitoring completion flag signal monitor_finish is in a first state.

A system for monitoring clock duty cycles according to an example of the present application, as an example, the calculation module is configured to select two of the basic quantity, the second quantity, and the third quantity that are close to each other, to determine an average value of the two, and to obtain the duty cycle according to the determined average value and the sampling times n.

A system for monitoring clock duty cycles according to an example of the present application, as an example, the monitored signal is triple-synchronized with the basic random clock signal in the basic monitoring circuit, with the second random clock signal in the second monitoring circuit, and with the third random clock in the third monitoring circuit; and a first counter of the basic monitoring circuit is configured to be set under the control of the first pulse signal, to be enabled by a signal obtained by performing an AND operation on a monitoring valid enable signal outputted by the second counter, a triple-synchronized monitoring enable signal and a triple-synchronized monitored clock signal, and to count, under the first random clock signal domain, the high levels of the triple-enabled monitored clock signal, so as to obtain a first quantity, a first counter of the second monitoring circuit is configured to be set under the control of the second pulse signal, to be enabled by a signal obtained by performing an AND operation on a monitoring valid enable signal outputted by the fourth counter, a triple-synchronized monitoring enable signal and a triple-synchronized monitored clock signal, and to count, under the second random clock signal domain, the high levels of the triple-enabled monitored clock signal, so as to obtain a second quantity; and a first counter of the third monitoring circuit is configured to be set under the control of the third pulse signal, to be enabled by a signal obtained by performing an AND operation on a monitoring valid enable signal outputted by the sixth counter, a triple-synchronized monitoring enable signal and a triple-synchronized monitored clock signal, and to count, under the third random clock signal domain, the high levels of the triple-enabled monitored clock signal, so as to obtain a third quantity.

A system for monitoring clock duty cycles according to an example of the present application, as an example, the second counter is configured to count down in the first random clock signal domain on the basis of the sampling times n, with a signal outputted after performing an AND operation on the monitoring valid enable signal outputted by the second counter and the triple-synchronized sampling enable signal as an enable signal; the fourth counter is configured to count down in the second random clock signal domain on the basis of the sampling times n, with a signal outputted after performing an AND operation on the monitoring valid enable signal outputted by the fourth counter and the triple-synchronized sampling enable signal as an enable signal; and the sixth counter is configured to count down in the third random clock signal domain on the basis of the sampling times n, with a signal outputted after performing an AND operation on the monitoring valid enable signal outputted by the sixth counter and the triple-synchronized sampling enable signal as an enable signal.

According to another aspect of the present application, there is also provided a method for monitoring clock duty cycles, which is executed in a circuit comprising a basic monitoring circuit and i additional monitoring circuits. The method comprises: causing the basic monitoring circuit to record, under a valid basic monitoring state and by a first counter of the basic monitoring circuit, a basic quantity of high levels of a monitored clock signal sampled by a basic random clock signal; causing each of the i additional monitoring circuits to record, under a respective valid additional monitoring state and by a first counter of the additional monitoring circuit, the quantity of high levels of a monitored clock signal sampled by the respective additional random clock signal, the phase of each random clock signal of the additional circuit being adjusted on the basis of the phase of a basic clock signal, so as to distinguish same from the basic random clock signal; wherein i is an integer greater than 1; and determining a duty cycle of the monitored clock signal on the basis of the basic quantity and the quantity of high levels determined for each of the i additional monitoring circuits.

According to the method for monitoring clock duty cycles, in some examples, i is 2, and two additional monitoring circuits of the system are respectively a second monitoring circuit and a third monitoring circuit, and the method comprises: setting the phase of the random clock signal of the second monitoring circuit to be opposite to the phase of the basic random clock signal, and setting the phase of the random clock signal of the third monitoring circuit to be opposite to the phase of the basic random clock signal.

According to the method for monitoring clock duty cycles in some examples, the method further comprises: setting, for the basic monitoring circuit, a signal monitor_finish_0 representing completion of monitoring under the basic random clock signal; setting, for the second monitoring circuit, a signal monitor_finish_1 representing completion of monitoring under the basic random clock signal; setting, for the third monitoring circuit, a signal monitor_finish_2 representing completion of monitoring under the basic random clock signal; and on the basis of the AND operation of the monitor_finish_0, the monitor_finish_1, and the monitor_finish_2, generating a flag signal monitor_finish representing whether the monitoring is completed.

According to the method for monitoring clock duty cycles, in some examples, the method comprises detecting whether the system monitoring completion flag signal monitor_finish is in a first state, upon detection that the system monitoring completion flag signal monitor_finish is in a first state, continuing the monitoring of the monitored clock signal, and upon detection that the system monitoring completion flag signal monitor_finish is in a second state, stopping the monitoring.

According to the method for monitoring clock duty cycles, in some examples, the first state is a low state of the system monitoring completion flag signal monitor_finish, and the second state is a high state of the system monitoring completion flag signal Monitor_finish.

BRIEF DESCRIPTION OF THE DRAWINGS

These and other features, aspects and advantages of the present disclosure will become better understood when the following detailed description is read with reference to the accompanying drawings, in which similar characters represent similar parts throughout, wherein.

DETAILED DESCRIPTION OF THE EMBODIMENTS

In order to make the above objects, features and advantages of the present disclosure more obvious and understandable, specific embodiments of the present disclosure will be described with reference to the accompanying drawings. It should be understood that the following detailed description is intended to help fully understand the present disclosure, and is not intended to limit the present disclosure.

Figure 1:
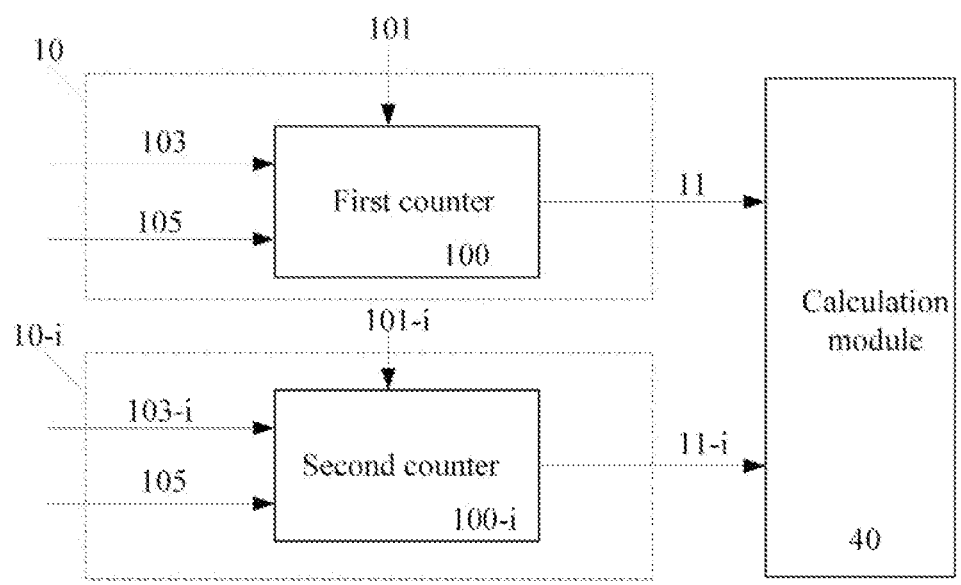
FIG. 1 is a schematic structural diagram of a system for monitoring clock duty cycles according to an example of the present disclosure.

FIG. 1 is a schematic structural diagram of a system for monitoring clock duty cycles according to an example of the present disclosure. As shown in FIG. 1, the system for monitoring the clock duty cycles includes a basic monitoring circuit 10 and i additional monitoring circuits 10-*i*. The basic monitoring circuit 10 is configured to record, under a valid monitoring state 101 and by the first counter 100 of the basic monitoring circuit, the basic quantity 11 of high levels of the monitored clock sampled by the basic random clock signal 103. Each of the i additional monitoring circuits 10-*i* is configured to record, under a valid additional monitoring state 101-*i* and by a first counter 100-*i* in the additional monitoring circuit 10-*i*, the quantity 11-*i* of high levels of a monitored clock signal sampled by an additional random clock signal 103-*i* of the additional circuit, the phase of the random clock signal 103-*i* of the additional circuit being adjusted on the basis of the phase of a basic clock signal 103, so as to distinguish same from the basic random clock signal 103. According to the present application, the phases of the random clock signals of various additional monitoring circuits are also set to be different from one another. As an example, the phase of the random clock signal 103-*i* is adjusted relative to the basic random clock signal 103 in the range of 0 degree to 180 degrees. In the examples of the present application, i is an integer greater than or equal to 1, such as 2 and 3. The calculation block 40 determines the duty cycle of the monitored clock signal on the basis of the basic quantity 11 and the quantity 11-*i* of high levels determined for each of the i additional monitoring circuits. It should be understood that the additional monitoring circuit 10-*i* illustrated in the figures is only one of the i additional monitoring circuits.

For the system for monitoring clock duty cycles as shown in FIG. 1, in the additional monitoring circuit, the phase of the random clock signal can be adjusted with respect to the phase of the basic random signal of the basic clock circuit. In this way, it is possible to improve the monitoring accuracy when the original clock accuracy is not high. In addition, from the perspective of probability, the adjusting of the phase of random clock signals is equivalent to sampling the sampled signals with different clock signals, so that the sampling times can be reduced.

According to the present application, an odd or even quantity of additional monitoring circuits can be selected, so that the system for monitoring clock duty cycles includes an even or odd quantity of monitoring circuits. In some examples, an even quantity of additional circuits are selected so that there are an odd quantity of monitoring circuits in the whole system, which is more beneficial for the calculation module to select the quantity of high levels in the monitored circuits obtained by the monitoring circuits, compared with a total even quantity of monitoring circuits. In the following examples with reference to FIG. 2 and FIG. 3, i is 2, namely, the system for monitoring the clock duty cycles includes three monitoring circuits. But this is not to say that i cannot be any other values.

Figure 2:
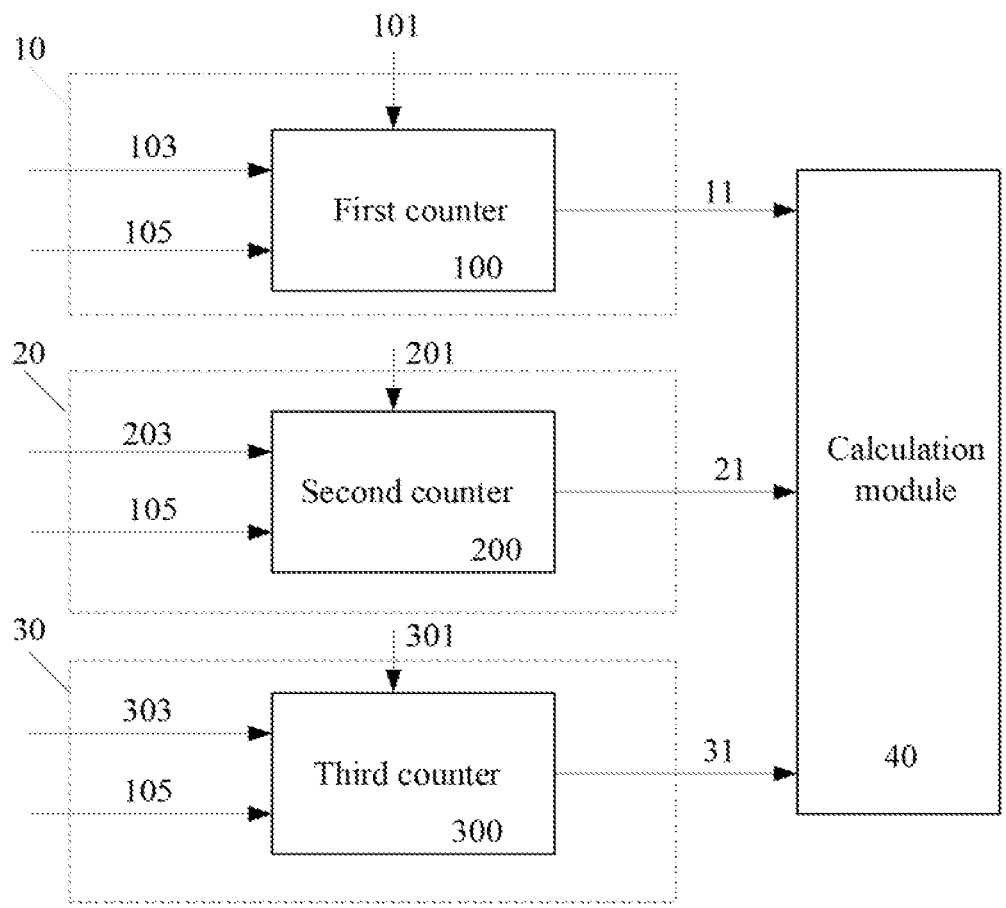
FIG. 2 is a structural diagram of a system for monitoring clock duty cycles according to another example of the present disclosure.

FIG. 2 is a schematic structural diagram of a system for monitoring clock duty cycles according to an example of the present disclosure, including two additional monitoring circuits. In the following examples of the disclosure, when combining with the drawings, the basic monitoring circuit is represented by the first monitoring circuit, and two additional monitoring circuits are represented by the second monitoring circuit and the third monitoring circuit respectively. As shown in FIG. 2, the system for monitoring clock duty cycles includes a first monitoring circuit 10, a second monitoring circuit 20, a third monitoring circuit 30 and a calculation module 16.

The first monitoring circuit 10 includes a first counter 100, and is configured to record, under a valid first monitoring state 101 and by the first counter 100, a first quantity (also referred to as the basic quantity) 11 of high levels of the monitored clock signal 105 sampled by the first random clock signal 103. The second monitoring circuit 20 includes a first counter 200 (i.e. the first counter of the second monitoring circuit 20), and is configured to record, under a valid second monitoring state 201 and by the third counter 200, a second quantity 21 of high levels of the monitored clock signal 105 sampled by the first random clock signal 203. The third monitoring circuit 30 includes a fifth counter 300 (i.e. the first counter of the third monitoring circuit 30), and is configured to record, under a valid second monitoring state 301 and by the fifth counter 300, a third quantity 31 of high levels of the monitored clock signal 105 sampled by the third random clock signal 303. The calculation block 40 is configured to calculate the duty cycle of the monitored clock signal on the basis of the first quantity 11, the second quantity 21 and the third quantity 31. According to an example of the present disclosure, the phase of the second random clock 203 may be adjusted by a second adjustment angle based on the phase of the first random clock 103, for example, the second adjustment angle is between 0 degree and 180 degrees. The phase of the third random clock 303 is adjusted to be the inverse of the first random clock 103. As an example, the phase adjustment can be performed by an inverter, a delay buffer, or the like.

Figure 3:
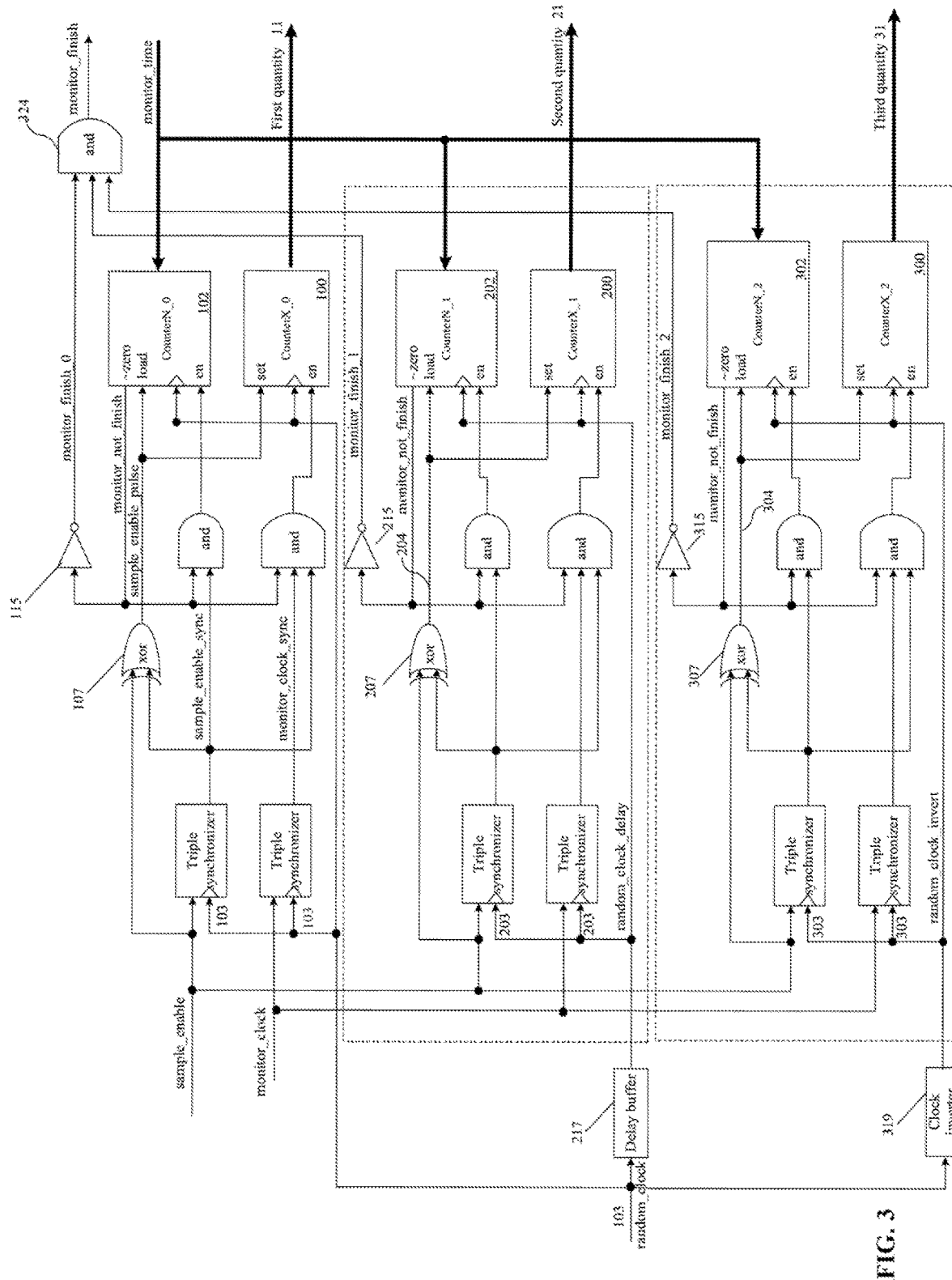
FIG. 3 is another structural schematic diagram of a system for monitoring clock duty cycles according to an example of the present disclosure.

FIG. 3 is another structural schematic diagram of a system for monitoring clock duty cycles according to an example of the present disclosure. As shown in the figure, the first monitoring circuit 10 further includes a first exclusive OR operation unit 107. One input of the first exclusive OR operation unit 107 is a monitoring enable signal sample_enable, and the other input of the first exclusive OR operation unit 107 is a signal sample_enable_sync obtained by synchronizing the monitoring enable signal sample_enable with the first random clock signal 103 by the triple synchronizer. The first exclusive-OR operation unit 107 performs an exclusive-OR operation on the monitoring enable signal sample_enable and the signal sample_enable_sync to generate a first pulse signal sample_enable_pulse. The first monitoring circuit 10 also includes a second counter 102. The second counter 102 is configured to latch, under the control of the first pulse signal sample_enable_pulse, sampling times n configured to the second counter 102. When the count of the second counter 102 is not 0 and the monitoring enable signal is valid (that is, the monitoring enable is started), a monitoring valid enable signal which is always valid is outputted. The first monitoring circuit 10 also includes a first inverter 115 that inverts the monitor valid enable signal monitor_not_finish to generate a signal monitor_finish_0.

The second monitoring circuit 20 also includes a second OR operation unit 207. One input of the second exclusive OR operation unit 207 is a monitoring enable signal sample_enable, and the other input of the second exclusive OR operation unit 107 is a signal obtained by synchronizing the monitoring enable signal sample_enable with the second random clock signal 203 through the triple synchronizer. The second XOR operation unit 207 performs XOR operation on the monitoring enable signal sample_enable and the signal synchronized by the second random clock signal 203 through the triple synchronizer, to generate the second pulse signal 204. The second monitoring circuit 20 also includes a forth counter 202. The fourth counter 202 is configured to latch, under the control of the second pulse signal 204, the sampling times n configured into the fourth counter 202. When the count of the fourth counter 202 is not 0 and the monitoring enable signal is valid, a monitoring valid enable signal which is always valid is outputted. The second monitoring circuit 20 also includes a second inverter 215 that inverts the monitor valid enable signal monitor_not_finish to generate a signal monitor_finish_1. The second random clock signal 203 is the output of the first random clock signal 103 after being subjected to the phase adjustment of the delay buffer 217. Here, the phase difference, adjusted by the delay buffer 217, between the second random clock signal 203 and the first random clock signal 103 is between 0 degree and 180 degrees, which can be set as required.

The third monitoring circuit 30 further includes a third exclusive OR operation unit 307. One input of the third exclusive OR operation unit 307 is a monitoring enable signal sample_enable, and the other input of the third exclusive OR operation unit 307 is a signal obtained by synchronizing the monitoring enable signal sample_enable with third second random clock signal 303 through the triple synchronizer. The third XOR operation unit 307 performs XOR operation on the monitoring enable signal sample_enable and the signal synchronized by the third random clock signal 303 through the triple synchronizer, to generate a third pulse signal 304. The third monitoring circuit 30 also includes a sixth counter 302. The sixth counter 302 is configured to latch, under the control of the third pulse signal 304, the sampling times n configured into the sixth counter 302. When the count of the sixth counter 302 is not 0 and the monitoring enable signal is valid, a monitoring valid enable signal which is always valid is outputted. The third monitoring circuit 20 also includes a third inverter 315 that inverts the monitor valid enable signal monitor_not_finish to generate a signal monitor_finish_2. The third random clock signal 303 is a signal obtained by inverting the first random clock signal 103 by the clock inverter 319.

As shown in FIG. 3, the system for monitoring clock duty cycles also comprises an AND operator 324 which receives monitor_finish_0, monitor_finish_1 and monitor_finish_2 and performs an AND operation on the three signals, so as to generate a system monitoring completion flag signal Monitor_finish. According to an example of the present application, when the system monitoring completion flag signal monitor_finish is in the first state, it indicates that the monitoring work is in progress. The first state is, for example, a low state of monitor_finish. As an example, if the signal monitor_finish is pulled high, then for example, an interrupt signal is generated and reported to relevant processing components (such as CPU) to end monitoring.

According to some examples of the present application, the monitored signal 105 is triple-synchronized with the first random clock signal 103 in the first monitoring circuit 10, with the second random clock signal 203 in the second monitoring circuit 20 and with the third random clock signal 303 in the third monitoring circuit 30. According to some examples of the present application, the first counter 100 is configured to control the setting of sample_enable_pulse by a first pulse signal. The first counter 100 is also configured to be enabled by a signal obtained by performing an AND operation on a monitoring active enable signal outputted by the second counter 102, a triple-synchronized monitoring enable signal and a triple-synchronized monitored clock signal. The first counter 100 counts the high levels of the triple-synchronized monitored clock signal 105 in the first random clock signal 103 domain, to obtain a first quantity 11. The third counter 200 is configured to be set by the second pulse signal control 204. The second counter 100 is also configured to be enabled by a signal obtained by performing an AND operation on a monitoring active enable signal outputted by the fourth counter 102, a triple-synchronized monitoring enable signal and a triple-synchronized monitored clock signal. The third counter 200 counts the high levels of the triple-synchronized monitored clock signal 105 in the second random clock signal 203 domain, to obtain a second quantity 21. The fifth counter 300 is configured to be set by the third pulse signal control 304. The fifth counter 300 is also configured to be enabled by a signal obtained by performing an AND operation on a monitoring active enable signal outputted by the sixth counter 302, a triple-synchronized monitoring enable signal and a triple-synchronized monitored clock signal. The fifth counter 300 counts the high levels of the triple-synchronized monitored clock signal 105 in the third random clock signal 303 domain, to obtain a third quantity 31.

According to some examples of the present application, the second counter 102 is configured to counts down in the first random clock signal 103 domain on the basis of the sampling times n, with a signal outputted after performing an AND operation on the monitoring valid enable signal outputted by the second counter and the triple-synchronized sampling enable signal sample_enable_sync as an enable signal, until the count value becomes 0. The fourth counter 202 is configured to count down in the second random clock signal 203 domain on the basis of the sampling times n, with a signal outputted after performing an AND operation on the monitoring valid enable signal monitor_not_finish outputted by the fourth counter and the triple-synchronized sampling enable signal as an enable signal, until the count value becomes 0. The sixth counter 303 is configured to count down in the third random clock signal 303 domain on the basis of the sampling times n, with a signal outputted after performing an AND operation on the monitoring valid enable signal outputted by the sixth counter and the triple-synchronized sampling enable signal as an enable signal, until a count value becomes 0.

In the system for monitoring the clock duty cycles exemplified above with reference to the drawings, as an example, the calculation module 16 can calculate the duty cycles of the monitored clock 105 according to the following formula (1):

$$DutyCycle=(((x+y)/2)/n)\times 100\% \qquad (1)$$

wherein, DutyCycle is the duty cycles of the monitored clock, X and Y are two similar values in the first quantity 11, the second quantity 21 and the third quantity 31, respectively, and n is the sampling times configured into the second counter, the fourth counter and the sixth counter.

Figure 4:
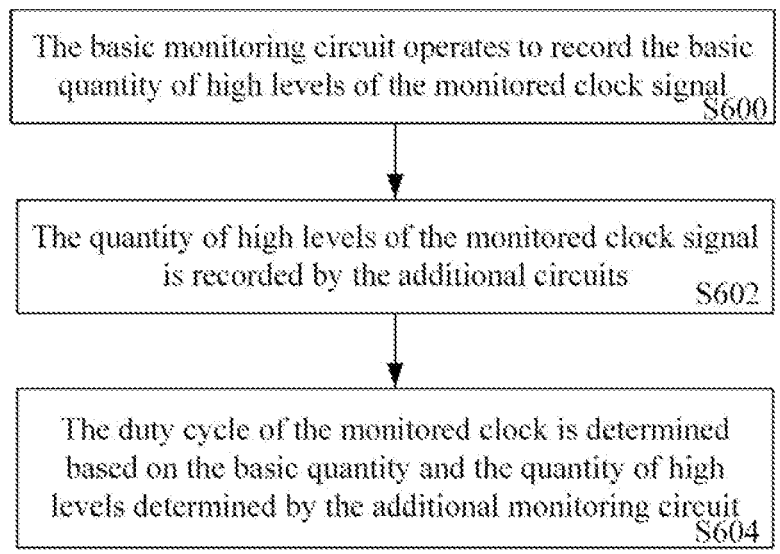
FIG. 4 is a flowchart of a method for monitoring clock duty cycles.

The present application also provides a method for monitoring clock duty cycles, which is implemented in the system described in conjunction with FIG. 1. FIG. 4 is a flow diagram of the method. As shown in FIG. 4, in step S600, the basic monitoring circuit 10 is records, under a valid monitoring state 101 and by the first counter 100 of the basic monitoring circuit 10, the basic quantity 11 of high levels of the monitored clock sampled by the basic random clock signal 103. In step S602, each of the i additional monitoring circuits 10-*i* records, under a respective valid additional monitoring state 101-*i* and by respective first counter 100-*i*, the quantity of high levels of a monitored clock signal sampled by an additional random clock signal 103-*i* of the additional circuit, wherein the random clock signal of each of the additional circuits, i.e., the phase of the additional random clock signal 103-*i* is adjusted on the basis of the basic clock signal, so as to distinguish same from the phase of the basic random 1S clock signal, and the additional random clock signals are also set to be different from each other. The method according to the present application further includes determining the duty cycle of the monitored clock signal on the basis of the basic quantity and the quantity of high levels determined for each of the i additional monitoring circuits, as shown in step S604.

According to some examples of the present application, i is 2, that is, two additional monitoring circuits are provided, i.e., the second monitoring circuit and the third monitoring circuit, such as the system described above in conjunction with FIG. 3. In this example, the method according to FIG. 4 further includes setting the phase of the random clock signal of the second monitoring circuit to be different from the phase of the basic random clock signal (i.e., the first random clock signal) 103. As an example, the first random clock signal 103 is adjusted relative to the phase of the basic clock signal by an adjustment angle of 0 degree to 180 degrees. The phase of the random clock signal of the third monitoring circuit is set to be opposite to the phase of the basic random clock signal. As an example, the phase of the random clock signal of the third monitoring circuit is set to be opposite to the phase of the basic random clock signal.

According to some examples of the present application, the method shown in FIG. 4 further comprises: setting, for the basic monitoring circuit, a signal monitor_finish_0 representing completion of monitoring under the basic random clock signal; setting, for the second monitoring circuit, a signal monitor_finish_1 representing completion of monitoring under the basic random clock signal; setting, for the third monitoring circuit, a signal monitor_finish_2 representing completion of monitoring under the basic random clock signal; and on the basis of the AND operation of the monitor_finish_0, the monitor_finish_1, and the monitor_finish_2, generating a flag signal monitor_finish representing whether the monitoring is completed. This example may be implemented, for example, in the system described above in conjunction with FIG. 3. Further, according to the method shown in FIG. 4, the method further comprises: detecting whether the system monitoring completion flag signal monitor_finish is in a first state, if so, continuing the monitoring of the monitored clock signal, and if it is in a second state, stopping the monitoring. According to an example of the present application, the first state is a low state of the system monitoring completion flag signal monitor_finish, and the second state is a high state of the system monitoring completion flag signal Monitor_finish. Alternatively, the first state and the second state may be set as needed, for example, the second state is a low state of the system monitoring completion flag signal monitor_finish, etc.

The embodiments described above with reference to the drawings can be modified and adjusted without departing from the main idea of the present application, for example, four or three additional circuits can be provided.

The foregoing embodiments merely represent several implementations of the present invention, and their descriptions are specific and detailed, but they are not intended to limit the scope of the present invention. It should be pointed out that, a person skilled in the art may make further modifications and improvements without departing from the concept of the present disclosure, and these modifications and improvements shall also fall within the scope of the present disclosure. Therefore, the scope of protection of the patent of the present invention shall be subject to the appended claims.

What is claimed is:

1. A system for monitoring clock duty cycles, comprising:
    a basic monitoring circuit configured to record, under a valid basic monitoring state and by a first counter of the basic monitoring circuit, a basic quantity of high levels of a monitored clock signal sampled by a basic random clock signal;
    i additional monitoring circuits, wherein each additional monitoring is configured to:
        record, under a valid additional monitoring state and by a first counter in the additional monitoring circuit, the quantity of high levels of a monitored clock signal sampled by an additional random clock signal of the additional circuit, the phase of the random clock signal of the additional circuit being adjusted on the basis of the phase of a basic clock signal, so as to distinguish same from the basic random clock signal;
        wherein i is an integer greater than or equal to 1;
        wherein the phases of additional random clock signals of respective additional monitoring circuits of the i additional monitoring circuits are configured to be different from one another; and
    a calculation module, configured to determine a duty cycle of the monitored clock signal on the basis of the basic quantity and the quantity of high levels determined for each of the i additional monitoring circuits.

2. The system according to claim 1, wherein i is 2, and the additional monitoring circuit comprises a second monitoring circuit and a third monitoring circuit, wherein
    the second monitoring circuit is configured to record, under a valid second monitoring state and by a first counter in the second monitoring circuit, a second quantity of high levels of a monitored clock signal sampled by a second random clock signal, the phase of the second random clock signal is adjusted relative to the phase of a basic random clock signal by an adjustment angle of 0 degree to 180 degrees;

the third monitoring circuit is configured to record, under a valid third monitoring state and a first counter of the third monitoring circuit, a third quantity of high levels of a monitored clock signal sampled by a third random clock signal, the phase of the third random clock signal being set to be opposite to the phase of the basic random clock signal; and the calculation module is configured to determine a duty cycle of the monitored clock signal on the basis of the basic quantity, the second quantity, and the third quantity.

3. The system according to claim 2, wherein the phase of the third random clock signal is opposite to the phase of the rust random clock signal.

4. The system according to claim 2, wherein,
the basic monitoring circuit comprises:
  a first exclusive-OR operation unit, configured to perform an exclusive-OR operation on the monitoring enable signal and a monitoring enable signal being in triple synchronization with the basic random clock signal, so as to generate a first pulse signal;
  a second counter, configured to latch, under the control of the first pulse signal, the sampling times a configured to the second counter, wherein a monitoring valid enable signal outputted by the second counter is always valid when the count in the second counter is not 0 and the monitoring enable signal is valid;
  a first inverter, inverting the monitoring valid enable signal to generate a signal monitor_finish_0;
the second monitoring circuit comprises:
  a second exclusive-OR operation unit, configured to perform an exclusive-OR operation on the monitoring enable signal and a monitoring enable signal being in triple synchronization with the second random clock signal, so as to generate a second pulse signal;
  a fourth counter, configured to latch, under the control of the second pulse signal, the sampling times n configured to the fourth counter, wherein the monitoring valid enable signal outputted by the fourth counter is always valid when the count in the fourth counter is not 0 and the monitoring enable signal is valid;
  a second inverter, inverting the monitoring valid enable signal to generate a signal monitor_finish_1;
the third monitoring circuit comprises:
  a third exclusive-OR operation unit, configured to perform an exclusive-OR operation on the monitoring enable signal and a monitoring enable signal being in triple synchronization with the third random clock signal, so as to generate a third pulse signal;
  a sixth counter, configured to latch, under the control of the third pulse signal, the sampling times n configured to the sixth counter, wherein the monitoring valid enable signal outputted by the sixth counter is always valid when the count in the sixth counter is not 0 and the monitoring enable signal is valid;
  a third inverter, inverting the monitoring valid enable signal to generate a signal monitor_finish_2; and
an AND operator that performs an AND operation on the received monitor_finish_0, monitor_finish_1 and monitor_finish_2, so as to generate a system monitoring completion flag signal monitor_finish;
wherein the clock monitoring circuit is configured to continue the monitoring operation under a signal indicating that the system monitoring completion flag signal monitor_finish is in a first state.

5. The system according to claim 2, wherein the calculation module is configured to select two of the basic quantity, the second quantity, and the third quantity that are close to each other, to determine an average value of the two, and to obtain the duty cycle according to the determined average value and the sampling times n.

6. The system according to claim 2, wherein the monitored signal is triple-synchronized with the basic random clock signal in the basic monitoring circuit, with the second random clock signal in the second monitoring circuit, and with the third random clock in the third monitoring circuit; and
  a first counter of the basic monitoring circuit is configured to be set under the control of the first pulse signal, to be enabled by a signal obtained by performing an AND operation on a monitoring valid enable signal outputted by the second counter, a triple-synchronized monitoring enable signal and a triple-synchronized monitored clock signal, and to count, under the first random clock signal domain, the high levels of the triple-enabled monitored clock signal, so as to obtain a first quantity;
  a first counter of the second monitoring circuit is configured to be set under the control of the second pulse signal, to be enabled by a signal obtained by performing an AND operation on a monitoring valid enable signal outputted by the fourth counter, a triple-synchronized monitoring enable signal and a triple-synchronized monitored clock signal, and to count, under the second random clock signal domain, the high levels of the triple-enabled monitored clock signal, so as to obtain a second quantity; and
  a first counter of the third monitoring circuit is configured to be set under the control of the third pulse signal, to be enabled by a signal obtained by performing an AND operation on a monitoring valid enable signal outputted by the sixth counter, a triple-synchronized monitoring enable signal and a triple-synchronized monitored clock signal, and to count, under the third random clock signal domain, the high levels of the triple-enabled monitored clock signal, so as to obtain a third quantity.

7. The system for controlling clock duty cycles according to claim 2, wherein
the second counter is configured to count down in the first random clock signal domain on the basis of the sampling times n, with a signal outputted after performing an AND operation on the monitoring valid enable signal outputted by the second counter and the triple-synchronized sampling enable signal as an enable signal;
the fourth counter is configured to count down in the second random clock signal domain on the basis of the sampling times n, with a signal outputted after performing an AND operation on the monitoring valid enable signal outputted by the fourth counter and the triple-synchronized sampling enable signal as an enable signal; and
the sixth counter is configured to count down in the third random clock signal domain on the basis of the sampling times n, with a signal outputted ater performing an AND operation on the monitoring valid enable signal outputted by the sixth counter and the triple-synchronized sampling enable signal as an enable signal.

8. A method for monitoring clock duty cycles, wherein the method is executed in a circuit comprising a basic monitoring circuit and i additional monitoring circuits, and the method comprises:

causing the basic monitoring circuit to record, under a valid basic monitoring state and by a first counter of the basic monitoring circuit, a basic quantity of high levels of a monitored clock signal sampled by a basic random clock signal;

causing each of the i additional monitoring circuits to record, under a respective valid additional monitoring state and by a first counter of the additional monitoring circuit, the quantity of high levels of a monitored clock signal sampled by the respective additional random clock signal, the phase of each random clock signal of the additional circuit being adjusted on the basis of the phase of a basic clock signal, so as to distinguish same from the basic random clock signal; wherein i is an integer greater than 1; and determining a duty cycle of the monitored clock signal on the basis of the basic quantity and the quantity of high levels determined for each of the i additional monitoring circuits.

9. The method according to claim 8, wherein i is 2, and two additional monitoring circuits of the system are respectively a second monitoring circuit and a third monitoring circuit, and the method comprises:

setting the phase of the random clock signal of the second monitoring circuit to be opposite to the phase of the basic random clock signal; and setting the phase of the random clock signal of the third monitoring circuit to be opposite to the phase of the basic random clock signal.

10. The method according to claim 9, further comprising:

setting, for the basic monitoring circuit, a signal monitor_finish_0 representing completion of monitoring under the basic random clock signal;

setting, for the second monitoring circuit, a signal monitor_finish_1 representing completion of monitoring under the basic random clock signal;

setting, for the third monitoring circuit, a signal monitor_finish_2 representing completion of monitoring under the basic random clock signal; and on the basis of the AND operation of the monitor_finish_0, the monitor_finish_1, and the monitor_finish_2, generating a flag signal monitor_finish representing whether the monitoring is completed.

11. The method according to claim 10, wherein detecting whether the system monitoring completion flag signal monitor_finish is in a first state, and upon detection that the system monitoring completion flag signal monitor_finish is in a first state, continuing the monitoring of the monitored clock signal, and upon detection that the system monitoring completion flag signal monitor_finish is in a second state, stopping the monitoring.

12. The method according to claim 11, wherein the first state is a low state of the system monitoring completion flag signal monitor_finish, and the second state is a high state of the system monitoring completion flag signal Monitor_finish.

* * * * *